ated Feb. 20, 1962

3,022,284
AZO DYESTUFFS

Sigmund C. Catino, Allentown, Pa., Albert F. Strobel, Phillipsburg, N.J., and William W. Williams, Easton, Pa., assignors to General Aniline & Film Corporation, New York, N.Y., a corporation of Delaware
No Drawing. Filed Dec. 30, 1954, Ser. No. 478,875
1 Claim. (Cl. 260—146)

The present invention relates to the production of novel azo dyestuffs devoid of carboxylic and sulfonic acid groups having the formula

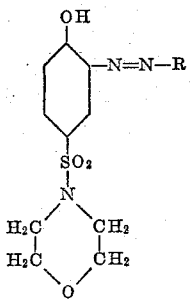

wherein R is selected from the group consisting of aromatic radicals of the benzene and naphthalene series containing an OH group ortho to the azo bridge, and the metal complexes of said dyestuffs.

Azo dyestuffs of the general type above containing sulfamyl amino phenols as diazo components and naphthols as coupling components are well known in the prior art. Such dyestuffs are usually employed in metallized form and generally contain free sulfonic acid groups, the function of which is principally to impart some degree of water solubility when dyeing wool, nylon and similar fibrous materials. However, most dyes having free sulfonic acid groups have the disadvantage that they do not exhaust well from a neutral dyebath. When they are applied from a weakly acidic dyebath the sulfonated metallized monoazo dyes often produce unlevel dyeings. Further, the wash fastness and light fastness properties of these dyestuffs have not been found to be completely satisfactory. The instant invention is based upon the discovery that dyestuffs of the above formula containing a sulfonmorpholide group in the configuration illustrated have surprisingly improved properties rendering them highly desirable and superior for commercial use. Thus, it has been found that the compounds of this invention have exceptionally good light and wash fastness on wool and nylon, in addition to having superior level dyeing properties.

The dyestuffs of this invention may be readily prepared in known manner by coupling diazotized 4-hydroxy-3-aminobenzene-sulfonmorpholide with a hydroxy-containing aromatic coupling component of the benzene and naphthalene series capable of coupling in ortho position to the hydroxyl radical. Such coupling components are well known in the prior art, and the following examples of coupling components operative herein are given for illustrative purposes only:

p-tertiary butyl phenol,
3-acetylamino-4-tertiary butyl phenol,
2-acetylamino-4-tertiary butyl phenol,
5,6,7,8-tetrahydro-2-naphthol,
p-cresol,
β-naphthol,
1-naphthol,
1-naphthol-3-sulfonamide,
1-naphthol-3-(N,N-dihydroxyethyl)-sulfonamide,
2-naphthol-6-sulfonamide,
2-naphthol-6-N-hydroxyethylsulfonamide,
1-acetylamino-7-naphthol,
7-hydroxy-1-naphthylurethane,
1-naphthol-3-sulonanilide,
2,8-dihydroxynaphthalene-6-N,N-dimethylsulfonamide,
2,8-dihydroxynaphthalene-6-sulfonamide,
1-naphthol-4-N-ethylsulfonamide,
1-naphthol-3,6-di-(N-ethyl)-sulfonamide,
1-naphthol-3,6-di(N,N-dimethyl)sulfonamide,
and the like.

The 4-hydroxy-3-aminobenzenesulfonmorpholide has the formula

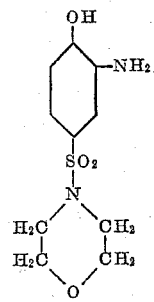

and may be prepared as follows:

Into a 3-liter flask equipped with a stirrer, thermometer, and condenser fitted with an HCl trap and dropping funnel was charged 1100 grams of chlorosulfonic acid. It was heated to 80° C., then over a 1-hour period 316 grams of 2-chloronitrobenzene was added. The reaction mixture was stirred 6 hours at 125° C. Then it was allowed to stand overnight. It was then drowned in about 6 liters of ice-water slush at −5° to 0° C. The slurry was stirred ½ hour and then filtered by suction. The wet cake of 4-chloro-3-nitro-benzenesulfonylchloride was washed on the funnel with 1500 ml. ice-water.

Into an 8-liter battery jar was charged 435 grams of morpholine (=5 moles) and 4000 ml. ice-water slush. The jar was cooled by an ice-bath, and at 5° C., 586 grams of the above sulfonylchloride was added slowly (over a period of 20 minutes). The slurry was stirred 6 hours at 5–10° C. and then stirring was continued overnight. The temperature was raised to 60° C. 150 ml. 18% hydrochloric acid was added. The slurry was cooled to 15° C. and filtered. The wet cake was washed on the funnel with 2000 ml. ice water. It was allowed to stand in air overnight at room temperature (presscake). The weight of the presscake of 4-chloro-3-nitro-benzenesulfonmorpholide amounted to 566 grams.

Into a 5-liter flask was charged 2700 ml. water and 360 grams of sodium hydroxide pellets. It was warmed to 90° C. and 508 grams of the presscake obtained above was added. The reaction mixture was stirred at reflux temperature for 5 hours, then filtered at 90° C. To the filtrate was added 1 liter water and 1240 ml. 18.5% hydrochloric acid to bring the material to congo acidity. The slurry was cooled to 15° C. and filtered. The 827 g. wet filter cake of 4-hydroxy-3-nitrobenzenesulfonmorpholide was washed on the funnel with 2500 ml. ice water.

Into a 5-liter flask equipped with stirrer, thermometer, condenser and heating mantle was charged a hot solution of 960 grams of sodium sulfide·9H₂O (=4.0 moles) in 1800 ml. water. Then 400 ml. 40% NaOH (=4.0 moles) was added. The solution was heated to 95° C. and the presscake from above was added. The reaction mixture was refluxed 3 hours at 104° C. The charge was filtered by suction. The filtrate was charged into an 8-liter battery jar and 2100 ml. 18.5% hydrochloric acid was added. The charge was stirred ½ hour at 95° C., and filtered hot. The sulfur cake was washed on the funnel with 800 ml. hot water. To the combined filtrate and washings was added 145 ml. 40% sodium hydroxide to pH=6.5. The slurry was cooled to 10° C. and filtered. The filter cake was washed on the funnel with 400 ml. ice water and air-dried at 65° C. Dry weight=325 g. (96.9% material) 4-hydroxy-3-amino-benzenesulfonmorpholide.

As will be understood by persons skilled in the art, the two hydroxy groups in the dyestuffs of this invention ortho to the azo bridge are the most usual groups employed in forming complexes with metals. However, it will be understood that other metallizable groups are operative, such as alkoxy (e.g. methoxy), acyloxy (e.g. acetoxy), benzenesulfoxy, and the like, such since groups are generally hydrolyzed during or before the metallization step whereby the metallized products are identical to those derived from the corresponding o,o'-dihydroxy azo dyestuffs.

The azo dyestuffs of the above formula may then be treated with an agent yielding metal in known manner in acid, neutral or alkaline media with or without the use of pressure and/or elevated temperatures. As substances yielding metal, there may be used for example metallizing agents yielding metals having atomic weights from 52 to 66, e.g., copper, nickel, iron and especially chromium and cobalt. These agents may be applied in the form of their oxides, hydroxides or salts, as for example, with inorganic or organic acids such as hydrochloric, sulfuric, hydrofluoric, formic, acetic, tartaric, salicylic, or the like. The metallizing agent may be used alone or in the presence of an additional substance which may or may not form a complex compound with the metallizing agent, as for example, ammonia, pyridine, ethylene diamine, ethanolamine, formamide, formic acid, acetic acid, oxalic acid, aliphatic and aromatic hydroxy-containing compounds such as alcohol, glycerin, aliphatic hydroxy carboxylic acids such as tartaric, lactic and citric acids and the like, aromatic hydroxy carboxylic acids such as salicylic acid and the like, sugars, cellulose derivatives, phenols, tannins and lignins and the like, soluble salts of sulfonic acids and carboxylic acids of the aliphatic, aromatic and hydroaromatic series, inorganic metal, alkali metal and alkaline earth metal salts, oxides and hydroxides and the like. Dispersing agents, solvents and other assistants may also be employed in the metallizing process.

The metallization may be conducted with one or several metallizing agents simultaneously or successively to yield mixed metalliferous complex azo compounds in accordance with this invention. The metallizing agent may be applied in such manner that the resulting product is one or a mixture of complex compounds of the azo dyestuff containing less than one atom, or one atom, or more than one atom of metal. Thus, the resulting metalliferous complex compound may represent the complex union of one atom of metal with from one-half to one or two or more molecules of the azo dyestuff, depending upon the valence and complex-forming characteristics of the metal, the reaction conditions and the like. In the case of the chrome and cobalt dyes, a metal:dye molecular ratio of 1:2 is preferred, while for nickel, iron and copper, a 1:1 ratio is preferred.

It will be readily understood that in the production of the dyestuffs of this invention as above described, diazotization and/or coupling and/or metallization may be carried out in substance, on a substratum, or in situ. These dyestuffs may be employed for coloring (dyeing, printing, pigmenting, etc.) in bulk, on the fiber, and the like. Since the metal complexes are water-insoluble pigment-like products, they are preferably converted to a dispersed form for application to textile fibers from an aqueous dyebath. The dispersion of these insoluble products may be carried out by mixing the metallized dye with at least an equal amount of a suitable dispersing agent, such as a naphthalene-formaldehyde sulfonic acid condensation product, and kneading the mixture in a Werner-Pfleiderer mixer for several hours. Excellent results may be obtained when applying such dispersed dyestuffs from a neutral or slightly acid aqueous bath to wool or nylon. The dyestuffs may also be employed for coloring other material such as silk, leather, mixed fibers, natural or synthetic materials in bulk, film, or fiber form such as cellulose esters and ethers, Orlon, Dacron, Dynel, Acrilan, Aralac, or the like. They may also be employed for coloring or pigmenting natural or artificial resins or plastics in bulk, organic solvents, stains, varnishes, lacquers, and the like.

The following examples in which parts are by weight unless otherwise indicated are illustrative of the instant invention and are not to be regarded as limitative. Unless otherwise indicated, parts by weight are in grams and parts by volume are in cc.

*Example 1*

Preparation and application of the dye:

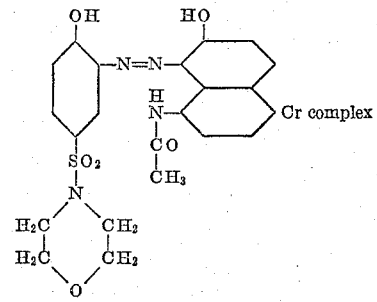

37.4 g. (=10/69 moles) of 4-hydroxy-3-amino-benzene-sulfonmorpholide was slurried in 150 ml. ice water slush containing 25 ml. concentrated hydrochloric acid. The slurry was stirred 15 minutes at 5–10° C., then 33.2 ml. of 30% (wt./vol.) sodium nitrite solution was added slowly. The diazo was stirred 15 minutes, then 0.65 ml. of 10% sulfamic acid (1 ml.=0.224 ml. 30% $NaNO_2$), 45.3 g. (=11/69 moles) 1-acetylamino-7-naphthol was dissolved in 400 ml. pyridine. Then 200 ml. 20% (wt./vol.) sodium carbonate was added, and the mixture was cooled to 20° C. The diazo was added to the coupler. After stirring 15 minutes the charge thickened. It was diluted with 400 ml. water. Coupling was complete at this point. 400 ml. water was added. The slurry was stirred 2 hours and 850 ml. of 18.5% (wt./wt.) hydrochloric acid was added slowly. The slurry was stirred an additional ½ hour, then filtered, and washed with 250 ml. water. Weight of presscake=140 g. Half of the presscake was used to prepare the chrome complex of the dye and the other half was used to prepare the cobalt complex described in Example 2 below.

70 g. of the above presscake was heated at 115° C. for 4 hours with 250 ml. formamide and 14.0 chromium formate paste (=2.5/69 g. atoms Cr). The reaction product was poured while hot into 750 ml. water. 100 g. salt was added. The slurry was stirred ½ hour, then filtered, washed with 100 ml. water, and dried. Dry weight=32 g. Of this product, 10 g. was milled three hours in a W-P (Werner Pfleiderer) mixer with an equal weight of the formaldehyde condensation product of naphthalene-2-sodium sulfonate in the form of a thick paste by adding small portions of water occasionally. The dispersed paste was then dried in a W-P mixer by raising the temperature.

0.4 g. of the dispersed powder was dissolved in 300 ml. water together with 0.3 g. of ammonium sulfate. Then a 10 g. piece of wool cloth was added and the dyebath raised to 100° C. over a 45 minute interval, agitating the cloth in the liquor in the meantime. The temperature of the bath was maintained at 100° C. for an additional hour with continued agitation of the wool, after which the material was removed, rinsed and dried.

The exhaust of the dye from the bath was complete, but at the same time a very level dyeing was obtained. A grey shade was obtained which has outstanding light fastness and very good fastness to washing. The dye gives a blue-grey shade when dyed on nylon, also with excellent light fastness and very good wash fastness. Dyeing on nylon is carried out as on wool.

*Example 2*

Preparation and application of the dye:

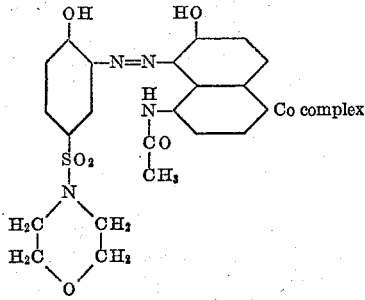

70 g. of the unmetallized dye cake of Example 1 above was slurried with 350 ml. of isopropanol. There was added a solution of 8.62 g. cobalt chloride in 25 ml. water. The charge was stirred 2½ hours at reflux. Then 300 ml. isopropanol was distilled off. 250 ml. water was added to the residue. The slurry was stirred ½ hour and then filtered by suction. Yield=55 g. wet cake which was dried at 60° C. to give 30.3 g. dry dye. 10 g. of the dry dye was dispersed with 10 g. of formaldehyde condensation product naphthalene-2-sodium sulfonate. Dyeing of this dye was carried out on wool in the same manner as the dye of Example 1. A blue-violet shade was obtained of very good light and wash fastness.

*Example 3*

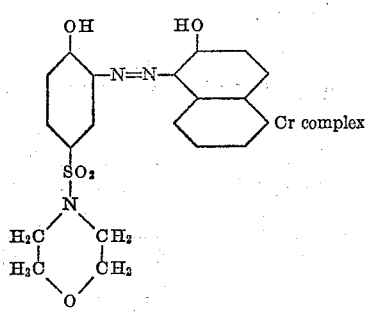

13.6 g. (4.0/69 moles) 3-amino-4-hydroxy-benzenesulfonmorpholide was slurried with 60 ml. ice-water slush and 10 ml. concentrated hydrochloric acid. Then 13.5 ml. 30% (wt./vol.) sodium nitrite was added at 0–10° C. The product was stirred 20 minutes, then 2.5 ml. (10% wt./vol.) sulfamic acid was added to destroy excess nitrite. A coupler solution was prepared by dissolving 8.6 g. (=4.4/69 moles) of β-naphthol in 100 ml. water and 6.5 ml. 40% (wt./vol.) sodium hydroxide. The material was cooled to 15° C. and 14.0 ml. concentrated (29% wt./wt.) ammonia added, and the product cooled to 10° C. The diazo was added to the coupler, and coupling was completed in a few minutes. The slurry was stirred overnight, then filtered to give 154 g. presscake.

Chroming of one-half of this dye was carried out by heating a mixture of 77 g. of the presscake, 6.2 g. chromium formate, and 200 ml. formamide at 98° C. for 6 hours on a steam bath. The reaction product was then poured into 400 ml. water, salted out with 50 g. salt and filtered. The filter cake was reslurried with 150 ml. $H_2O$, and refiltered, then dried in an air oven at 65° C. Dry weight=14 g. Dispersion was carried out as in Example 1. The dye gave a violet shade on wool with very good light fastness and wash fastness.

*Example 4*

Preparation and application of the dye:

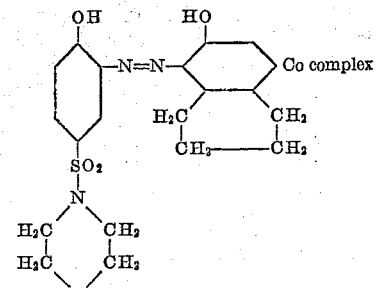

3.25 g. (1.0/69 moles) of 3-amino-4-hydroxy-benzenesulfonmorpholide was dissolved in 50 ml. water and 1.4 ml. 40% sodium hydroxide. There was added 5.0 ml. 37% hydrochloric acid, the material was cooled to 5° C., then diazotized with 10.0 ml. 9.94% sodium nitrite to give slight excess of nitrite. Then 0.3 ml. sulfamic acid was added to destroy excess nitrite. 6.0 ml. of sodium carbonate was added to give pH=8.0, then salted out and filtered and washed with 30% salt solution.

A coupler solution was prepared by dissolving 2.36 g. (1.1/69 moles) of 5,6,7,8-tetrahydro-2-naphthol, 1.56 ml. 56% potassium hydroxide and 50 ml. formamide, cooled to 10° C. The diazo was added as a wet presscake to the coupler, the material was stirred one hour after which coupling appeared complete. The product was poured into 300 ml. water, salted out with 75 g. salt and filtered.

The wet presscake of dye was dissolved in 100 ml. isopropanol together with 1.73 g. cobaltous chloride hexahydrate (0.5/69 moles). The mixture was charged into a 250 ml. 3-necked flask equipped with stirrer, condenser, and thermometer and heated on a heating mantle at reflux for 3 hours in a closed system. It was then drowned in 300 ml. water and the isopropanol boiled off on a steam bath. Dry weight of metallized dye after filtering and drying=4.0 g. Dispersion was carried out as in Example 1. The dispersed dye gave a red-brown shade on wool of very good light and wash fastness.

*Example 5*

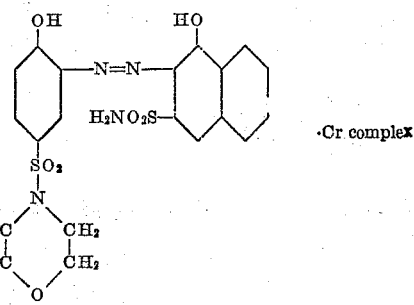

The diazotization of 20/69 moles of 4-hydroxy-3-aminobenzenesulfonmorpholide was carried out in the same manner as in Example 1. A coupler solution was prepared by slurrying 71.1 g. (22/69 moles) of 1-naphthol-3-sulfonamide in 600 ml. of 10% (wt./vol.) of sodium bicarbonate solution and 840 ml. of 20% (wt./vol.) of sodium carbonate solution. 500 g. ice was added to bring the temperature to 10° C. The diazo solution was added to the coupler slowly over a period of about 15 minutes, keeping the material at approximately 10° C. The diazo solution was added to the coupler slowly over a period of about 15 minutes. After 1 hour coupling had not yet taken place. It coupled in 2 hours, was filtered, washed with 600 ml. 5% salt solution, then dried at 65° C. in an air oven. Dry weight of dye=122 g.

61.1 (10/69 moles) of the above dye was heated at 90° C. with 1 liter water. The material was then added to a mixture of 143 ml. sodium chromium salicylate solution (5.5/69 moles). One liter of water was added. The pH of the mixture was adjusted to 5.0 by adding 170 ml. of 3.76% hydrochloric acid. The mixture was then charged into a 500 ml. 3-necked flask, equipped with a stirrer, condenser, and thermometer, and heated to 100° C. for 3 hours. It was then drowned in 300 ml. water, salted out with 200 g. salt, filtered and air-dried at 65° C. Dry weight of metallized dye=150 g.

Dyeing of wool is carried out as in Example 1. A blue-grey shade is obtained with excellent fastness to light and very good fastness to washing.

*Example 6*

Preparation and application of the dye:

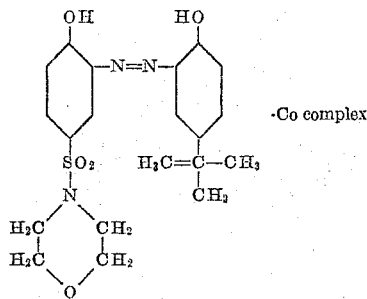

This metallized dye is prepared in the same manner as the dye of Example 4, using equimolar proportions of p-tertiary butyl phenol in place of the β-tetralol used in Example 4. Instead of requiring 1 hour for coupling, in this case 6 hours time was required to complete the coupling.

A redder brown shade was obtained on wool with this dye than with the dye of Example 4. Fastness properties were equally as good for this product as for the product of Example 4.

*Example 7*

Preparation and application of the dye:

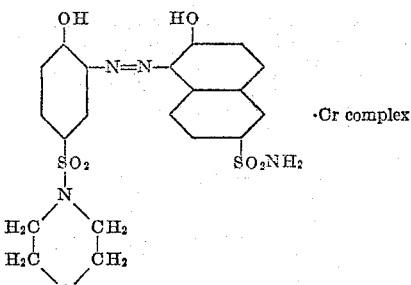

18.7 g. (=5/69 moles) 4-hydroxy-3-amino-benezene-sulfonmorpholide was diazotized in the manner described in Example 1. A coupler solution was prepared by dissolving 17.8 g. (=5.5/69 moles) of 2-naphthol-6-sulfonamide in 100 ml. water and 26 ml. 40% sodium hydroxide (wt./vol.). The material was dissolved by warming to 70° C. on a steam bath. To it was added 167.0 ml. of 20% (wt./vol.) sodium carbonate and the solution was cooled to 10° C. The diazo was added slowly to the coupler, the precipitate was stirred 10 hours. The dye was filtered to give 100 g. of presscake.

Chroming was carried out by heating this presscake at 100° C. with 14.0 g. chrome formate paste (2.5/69 moles) and 300 ml. formamide for 3 hours. The material was then poured into 400 ml. water, salted out with 50 g. salt, filtered and dried to give 15.5 g. dye. The material dyed wool and nylon in a grey violet shade with very good light and wash fastness.

This invention has been disclosed with respect to certain preferred embodiments, and various modifications and variations thereof will become obvious to the person skilled in the art. It is to be understood that such modifications and variations are to be included within the spirit and purview of this application and the scope of the appended claim.

We claim:

A chromiferous complex of a dyestuff having the formula

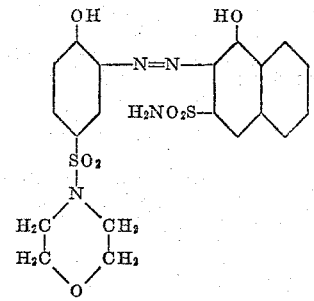

References Cited in the file of this patent

UNITED STATES PATENTS

| | | |
|---|---|---|
| 2,019,915 | Krzikalla et al. | Nov. 5, 1935 |
| 2,200,005 | McNally et al. | May 7, 1940 |
| 2,224,144 | Dickey et al. | Dec. 10, 1940 |
| 2,683,707 | Brassel | July 13, 1954 |
| 2,734,895 | Zickenraht et. al. | Feb. 14, 1956 |

FOREIGN PATENTS

| | | |
|---|---|---|
| 513,489 | Belgium | Feb. 13, 1953 |
| 522,677 | Belgium | Sept. 30, 1953 |